United States Patent [19]

Schrodi et al.

[11] Patent Number: 5,319,360

[45] Date of Patent: Jun. 7, 1994

[54] ATM EXCHANGE WHICH RESEQUENCIES THE CELLS USING THEIR SEQUENCE NUMBERS

[75] Inventors: Karl Schrodi, Heimsheim; Gert Eilenberger, Kirchheim; Bodo Pfeiffer, Schwieberdingen; Bozo Cesar, Stuttgart, all of Fed. Rep. of Germany

[73] Assignee: Alcatel N.V., Amsterdam, Netherlands

[21] Appl. No.: 668,632

[22] Filed: Mar. 13, 1991

[30] Foreign Application Priority Data

Mar. 14, 1990 [DE] Fed. Rep. of Germany ....... 4008080

[51] Int. Cl.$^5$ ............................................ H04Q 11/04
[52] U.S. Cl. ................................. 340/825.02; 370/60; 370/94.1
[58] Field of Search ............... 340/825.02; 370/60, 370/60.1, 94.1, 94.2

[56] References Cited

U.S. PATENT DOCUMENTS

| | | | |
|---|---|---|---|
| 4,703,475 | 10/1987 | Dretzka | 370/60 |
| 4,813,037 | 3/1989 | Debuysscher et al. | 370/60 |
| 5,062,106 | 10/1991 | Yamazaki | 370/94.1 |
| 5,127,000 | 6/1992 | Henrion | 370/60 |

FOREIGN PATENT DOCUMENTS 3082243 4/1991 Japan .

OTHER PUBLICATIONS

W. Schmidt, "Die Vermittlungstechnik in integrierten Paket Ubermittlungs-systemen–Einfuhrung und Systemubersicht", De Fernmelde=Ingenieur, No. 9, Sep. 1987.

Primary Examiner—Donald J. Yusko
Assistant Examiner—Brian Zimmerman
Attorney, Agent, or Firm—Robbins, Berliner & Carson

[57] ABSTRACT

Prior Art/Technical Problem: During the establishment of a call through a switching network 20, the path is selected on the basis of the instantaneous loading of the switching network and maintained during the call. The problem of eliminating local blocking by rearranging existing connections has not been satisfactorily solved because of errors occurring during the rearranging process.

Basic Idea: Provide in an ATM exchange operating with virtual connections the same devices which assure the correct order of the cells in the "connectionless" mode.

Solution: Each output of the switching network is followed by an output unit 30 which ensures that the cells are output in the correct order.

Advantage(s): Virtual connections can be adapted to the instantaneous loading of the switching network error-free at any time. The assurance of the correct order can be implemented so as to largely compensate for delay jitter.

4 Claims, 3 Drawing Sheets

ATM EXCHANGE WHICH RESEQUENCIES THE CELLS USING THEIR SEQUENCE NUMBERS

TECHNICAL FIELD

The present invention relates to an ATM, exchange operating with virtual connections.

CLAIM FOR PRIORITY

This application is based on and claims priority from applications first filed in Germany under Application No. P 40 08 080.3 To the extent such prior application may contain any additional information that might be of any assistance in the use and understanding of the invention claimed herein, it is hereby incorporated by reference.

BACKGROUND ART

This is the usual design of many of the ATM exchanges that have become known so far. Reference is made to Section 3, headed "Vermittlungsablauf", on pages 6 to 9 of an article by W. Schmidt in "Der Fernmelde=Ingenieur", No. 9, Sep. 1987, where the basic switching sequence in an ATM exchange of such a design is described.

Path information can be both connection numbers (Virtual Channel Identifiers, VCI), which are evaluated in each switching element with the aid of connection tables, and a number of addresses (routing tags) with which the individual switching elements are directly controlled. Examples of this are known in the art.

During the establishment of a call through a switching network, the path is selected on the basis of the instantaneous loading of the switching network and maintained for the whole duration of the call. It may happen that all paths that are possible for a new connection are already so heavily loaded that the new connection cannot be accepted. In many of those cases, however, one of the existing connections preventing the new connection can be routed along an alternative path through the switching network which is still sufficiently loadable. This problem also arises in conventional exchanges. The problem of eliminating local blocking by rearranging existing connections has not been satisfactorily solved because of errors occurring during the rearranging process.

DISCLOSURE OF INVENTION

The fundamental idea underlying the invention is to provide in ATM exchanges operating with virtual connections the same devices which assure the correct order of the cells at the output in ATM exchanges with "connectionless connections".

"Connectionless connections" are those connections in which the individual cells of a connection do not follow the same path but are distributed to all possible paths. This results in quite uniform loading; traffic measurements can be dispensed with, so that the devices required for this purpose are not necessary. From outside, however, this mode of operation is not to be recognizable. Outwardly, all connections are to act like virtual connections. Therefore, it is necessary to watch the correct order of the cells at the output since mutual overtaking inside the exchange cannot be ruled out.

Not every ATM exchange can and is to be operated with "connectionless connections". Especially if the exchange also handles distribution ("broadcast") services and makes the necessary copies in the switching network, only virtual connections are possible, at least for the distribution services. In the case of distribution services, however, it is particularly desirable to be able to resolve local blocking by rearranging existing connections.

If an output unit for restoring the correct cell sequence is provided at each output, virtual connections can be adapted error-free to the instantaneous loading of the switching network at any time.

BRIEF DESCRIPTION OF DRAWINGS

The invention will become more apparent from the following description of an embodiment taken in conjunction with the accompanying drawings, in which.

BEST MODE FOR CARRYING OUT THE INVENTION

Figure 1:
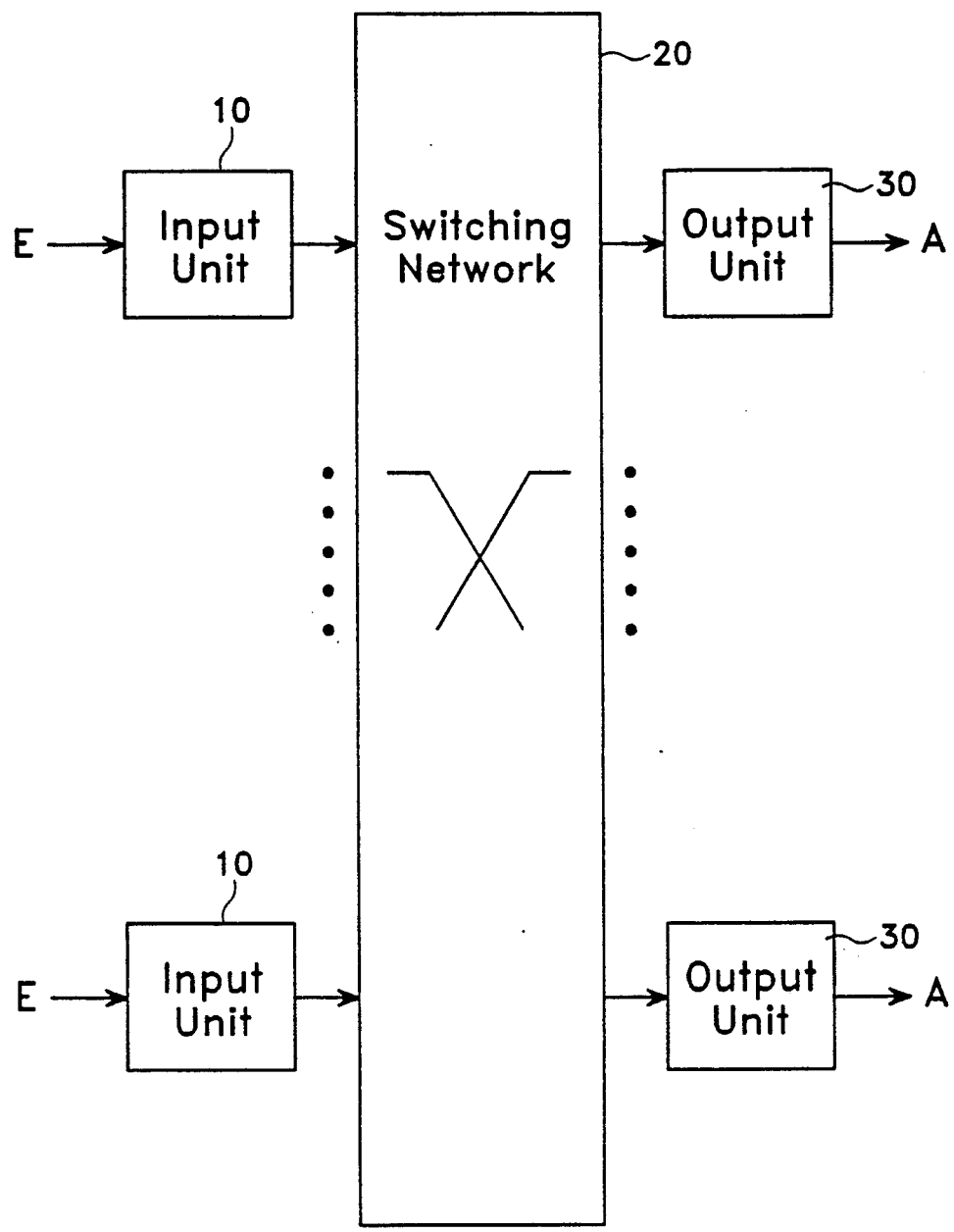
FIG. 1 is a coarse block diagram of an exchange in accordance with the invention.

As shown in FIG. 1, an exchange according to the invention.

Like any other exchange, has a plurality of inputs E, a plurality of outputs A, and a switching network 20. According to the invention, an output unit 30 is provided between the switching network 20 and each output A. Further, according to a special aspect of the invention, an input unit 10 is provided between each input E and the switching network 20.

First it should be noted that most exchanges have some kinds of input and output units.

The functions of each input unit 10 include adding to each cell to be switched path information for a given, connection-oriented path through the switching network. That and how this is done is known in principle from the above-cited article in "Der Fernmelde=Ingenieur". Detailed solutions are meanwhile familiar to those skilled in the art.

In the penultimate paragraph on page 7 of that article, reference is made to "Systeme, die mit Zei. tmarken arbeiten" (systems which operate with time stamps). In such systems, "the time of arrival of a packet must be determined and added to the packet information at the input of the node". If these time stamps provide sufficiently fine resolution, they can also be used to label the order of the cells. Even if actually no time stamps are needed, the same approach can be used to label the order. It is also possible, however, to use independent modulo-N counters in each input unit to allocate these labels, hereinafter also referred to as "labels of a first kind". Since the correct order must only be assured between the cells of each connection, the connection numbers, if present, can be used as an elimination criterion; they will hereinafter be referred to as "labels of a second kind". The labels of a first kind can be allocated both separately for the cells of each connection and jointly for the cells of all connections routed through one input unit.

Further, information which the cells carry with them when entering the exchange can be evaluated in the switching network for path selection and in the output units for determining the order of the cells. Special devices, here input units, are not necessary in this case.

The switching network 20 can be any switching network in which all cells of the same connection follow a given, connection-oriented path.

An embodiment of an output unit 30 will now be described with the aid of FIGS. 2 and 3.

The fundamental idea of this embodiment is to hold each cell at the output until it is certain that no older cell can be buffered in the switching network. Before the cell is passed on, a check is made to determine whether one of the cells that arrived at the output later than that cell is to be output earlier than that cell.

This is preferably implemented by providing a buffer at the output end which is operated, at least in part, in the manner of a shift register, thereby introducing a predetermined delay. Prior to the output of a cell, at least the shift-register-like portion of the buffer is examined as to whether a cell written in later is to be output earlier; if so, the two cells are interchanged.

In this embodiment of an output unit, a data stream is assumed in which all bits of a cell are transferred simultaneously over parallel lines. As a rule, that is neither the case nor particularly advantageous. On the one hand, however, it is always possible to produce such a data stream by means of serial-to-parallel converters, parallel-to-serial converters, and buffers, and on the other hand, those skilled in the art will be readily able to adapt the present embodiment to a specified data format as is used, for example, in an ATM exchange. In that case, it will be advantageous or even necessary to store in the buffer not the cells themselves, but only the information required to rearrange and retrieve the cells stored in a separate memory. Indirect addressing is familiar to those skilled in the art. It can be readily used in the example shown; then, instead of the data, the addresses of the data are stored.

Figure 2:
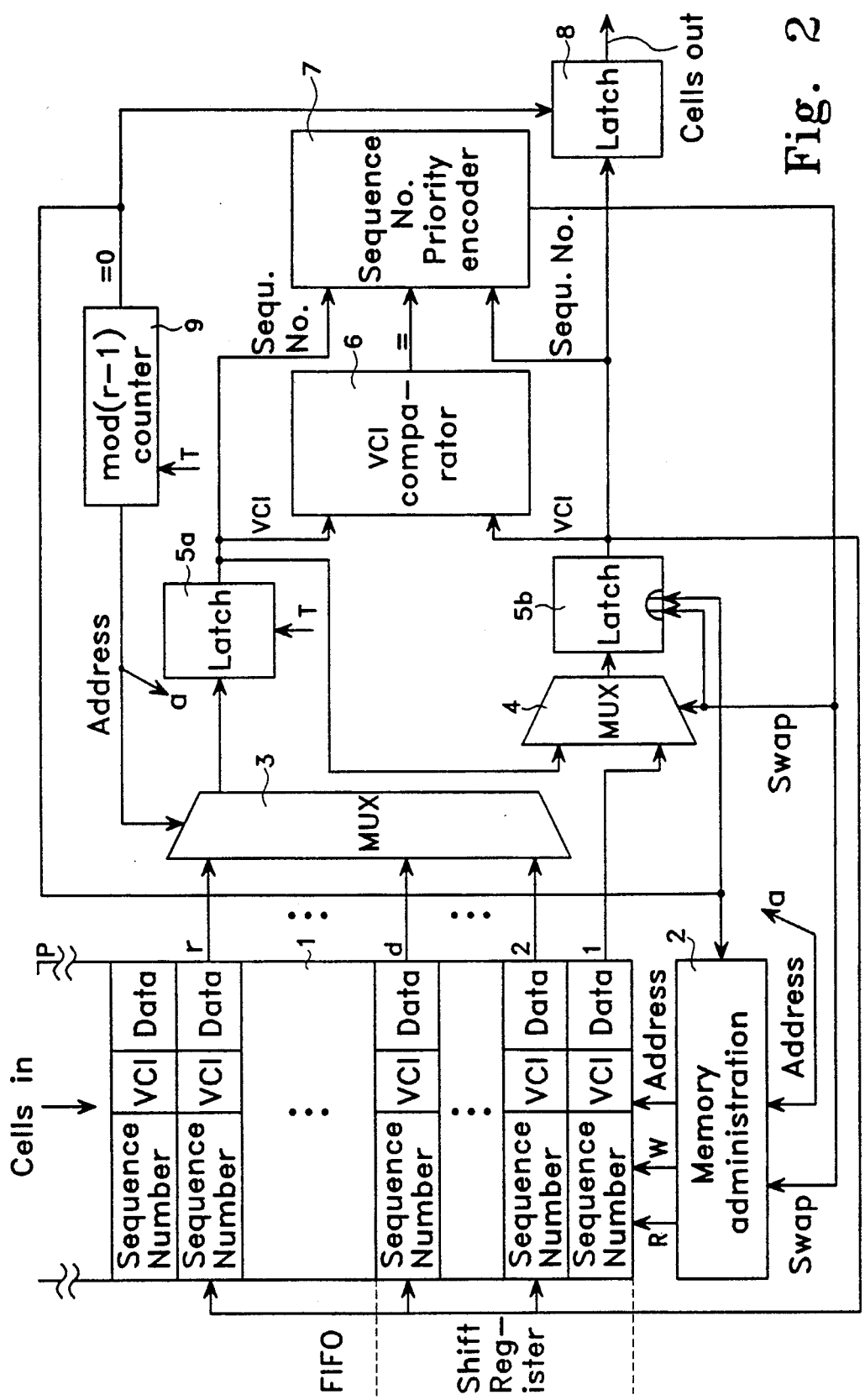
FIG. 2 is a block diagram of an output unit for the exchange in accordance with the invention.
Figure 3:
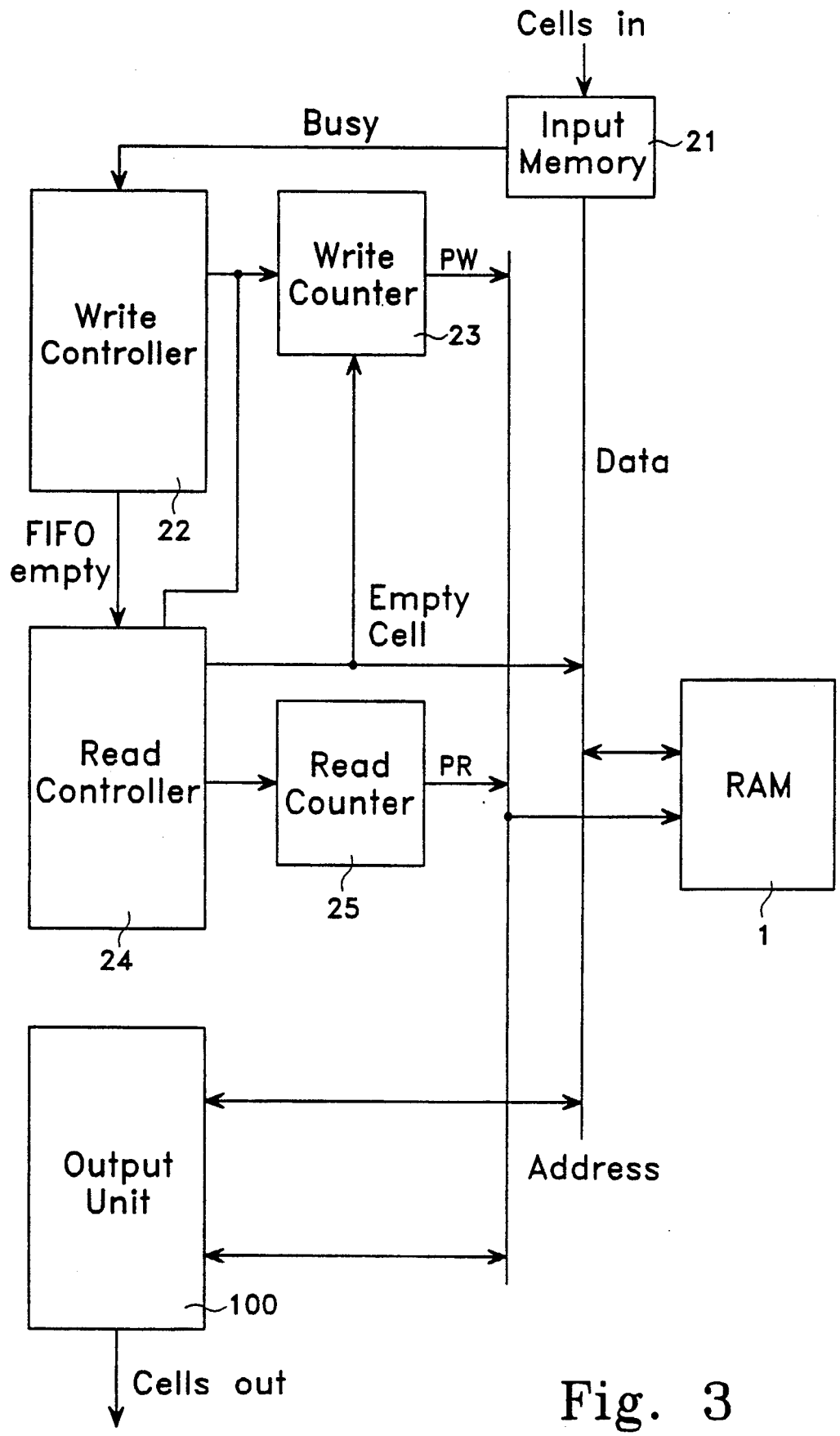
FIG. 3 shows an implementation of the buffer included in the output unit of FIG. 2.

The output unit shown in FIG. 2 includes a buffer 1, a memory management unit 2, two multiplexers 3 and 4, two latches 5a and 5b, two comparators 6 and 7, an additional latch 8, and a counter 9.

The buffer 1 has p locations. Each location is capable of containing one complete cell. According to an important aspect of the invention, each cell consists of label of a first kind, designated "Sequence Number", a label of a second kind, designated VCI (=Virtual Circuit Identifier), and the remainder of the cell, designated "Data". The representation of FIG. 2 does not illustrate the actual memory requirements of the individual parts correctly.

To allocate the labels of a first kind, use is preferably made of a modulo-N counter, with N having to be chosen so large that within a predetermined time, Less than N/2 numbers are allocated as labels of a first kind. Because of the periodic occurrence of all numbers, there must be a sufficient distance in both directions to obtain unambiguity. With the specified choice of N, all those cells can be unambiguously reconstructed in their original order which are not farther than said predetermined time apart when the numbers are being allocated. This time must then be preset so that, except for the permitted error rate, it is ensured that within this time each cell passes through the last r locations of the buffer 1. An approximate guide value for the time to be preset is twice the difference between the maximum delay and the minimum delay between the allocation of the labels of a first kind and the arrival in the output unit.

The label of a second kind, VCI, identifies the association of a cell with a particular virtual connection.

Instead of the remainder of the cell, "Data", the address where this remainder is stored in another memory may be stored in the buffer 1.

The buffer 1 is divided into three portions, namely a shift-register-like portion, labelled "Shift Register", with locations 1 through d, and a portion operated in the manner of a FIFO memory, labelled "FIFO", which, in turn, is composed of two portions with locations d+1 through r and r+1 through p, respectively, At least locations 1 through r must be individually accessible such that their contents can be read or that new contents can be written into them.

The buffer size, i.e., the choice of the numerical values for d, r and p, depends on the specific application. The main considerations are the permissible error rate, the minimum and maximum delays of a cell from the first branching point, the number of simultaneous connections permitted via one output unit, the minimum and maximum numbers of cells permitted for a connection per unit of time, and the permissible variation of the number of cells per unit of time. For a typical application, a simulation yielded values of d=10, r=34 and p=330. The values can be regarded as approximate guide values for other cases. For optimization in individual cases, individual investigations are necessary. The choice of the range of values for the labels of a first kind, "Sequence Number", is dependent on the above values. For these numerical values and the connection-specific determination of these labels, a guide value is N=512.

Cells arriving at the input of the output unit, which are labelled "Cells in", are first examined as to whether they are cells to be transferred out at the output or cells ending in the output unit. These are, on the one hand, empty cells and, on the other hand, cells containing the control signals for the output unit (or an input unit commonly connected to the latter which is not otherwise reachable). The cells to be output are entered into the buffer 1, such that they first "fall through" to the lowest free location in the portion operated in the manner of a FIFO memory. Whenever a cell is fed out at the output, all cells in the buffer move down by one location. If the last location of the FIFO memory, d+1, is occupied, the cell contained therein will be transferred into the first location of the shift register, d. If location d+1 is empty, an empty cell must be written into location d. The residence time of each cell, at least relative to any other cell, can thus be derived from its position in the buffer 1. The output from the buffer 1 will be described below.

The memory management unit 2 is shown in FIG. 2 highly schematically. It has a dual function. First, it manages the above-described normal operation of the buffer 1. This is done by applying addresses, labelled "Address", write instructions, W, and read instructions, R. Also required (not shown in FIG. 2) information as to the presence or absence of a cell be written in. The second function of the memory management unit 2 is to exchange the contents of the location addressed by the counter 9, "Address", for the contents of the latch 5b if an instruction, "Swap", is given to do so.

Through the multiplexer 3, the contents of any one of locations 2 through r of the buffer 1 can be accessed on a selective basis and transferred into the latch 5a. The memory location is selected by the counter 9, "Address".

At the beginning of an output cycle, the contents of location 1 of the buffer 1 are transferred to the latch 5b through the multiplexer 4. That will be the case when the counter 9 is reset, "=0". A special instruction, Swap, applied to the multiplexer 4 causes the contents of the latch 5a to be transferred to the latch 5b. The fact that by means of the same instruction, Swap, data is written into and read from the latch 5b is nothing unusual and can be taken into account by taking measures familiar to those skilled in the art.

The comparator 6 compares the labels of a second kind, VCI, of those two cells which are currently stored in the latches 5a and 5b. Only if the two labels of a second kind are equal, i.e., if the two cells belong to the same connection, will the subsequent comparator be activated.

The comparator 7 compares the labels of a first kind, "Sequence Number", of the two cells contained in the latches 5a and 5b. If the comparator 6 indicates that the two cells belong to the same connection, and the comparator 7 indicates that the cell contained in the latch 5a is older than that contained in the latch 5b, an instruction, Swap, will be provided which causes the older cell to be transferred to the latch 5b and the younger cell to take the place of the older cell in the buffer 1. The two cells are thus interchanged.

The counter 9 provides the correct timing. It counts periodically from 2 to r at a predetermined clock rate T.

If the counter 9 is reset, "=0", at the count r, one output cycle will be terminated and the next output cycle will be started. The contents of the Latch 5b, found in the previous cycle to be the oldest cell belonging to a particular connection, are transferred to the Latch 8 and are available at the output of the Latter, "Cells but". At the same time, the contents of Location I of the buffer 1 are transferred through the multiplexer 4 to the latch 5b. After that, locations 2 through r are successively searched for older cells (Labels of a first kind) of the same connection (Labels of a second kind). To this end, the contents of each of these locations are transferred through the multiplexer 3 to the latch 5a and compared by means of the comparators 6 and 7. The above-described exchange actions, Swap, ensure that at the count r of the counter 9, the oldest cell of the connection being considered is actually stored in the latch 5b, and that all younger cells of this connection are still or again contained in the buffer 1.

The representation of the output unit in FIG. 2 illustrates mainly the operation of the output unit. The construction and management of the buffer, which consists of a portion operated in the manner of a FIFO memory and a portion operated in the manner of a shift register, are apparent from FIG. 3. The clock distribution, including the distribution of the write and read instructions, is not shown in FIG. 3.

The buffer is implemented with a random-access memory (RAM), 1'. The incoming cells are applied through an input memory 21 to a data bus, "Data", to which the random-access memory 1' is connected. A write controller 22 is activated, "Busy", by the input memory 21 when a cell to be written in is applied. Via the write counter 23, an address PW is applied over an address bus, "Address", to the random-access memory 1', and the cell is written into the latter. The write counter 23 is then incremented from the write controller 22. A read controller 24 specifies via a read counter 25 the address, PR, which corresponds to location 1. After each cell output, the read counter 25 is incremented from the read controller 24. The difference between the contents PW of the write counter 23 and the contents PR of the read counter 25 must always be at least equal to d. This is monitored by the write controller 23; if this condition is not fulfilled, "FIFO empty", this will be signalled to the read controller 24, which will apply an empty cell, "Empty Cell", to the data bus, "Data", and cause this empty cell to be written into the location specified by the write counter 23. The read controller 24 will then increment the write counter 23.

The remainder of the output unit is indicated by an access, comparator, and output unit 100.

Following are examples of possible further modifications of the output unit.

During the search for the oldest cell of a connection, it is not absolutely necessary that a relatively older cell be exchanged several times for the cell to be fed out. It suffices to search the entire memory area, to retain only the position and age of the oldest cell found, and to exchange only once at the end of the search process.

It is also possible not to exchange at all and to output the oldest cell first.

The shift-register-like portion of the buffer need not necessarily form the end of the buffer. It may also be located at the beginning or in the middle of the buffer.

The following considerations may lead to entirely different output units.

Typical examples of distribution services are conference circuits and sound or television broadcasts. The associated cells represent a continuous signal stream. They are formed in the transmitter at constant intervals and are needed in the receiver not only in the correct order but also at the original constant intervals.

The regular restoration of constant intervals is not only technically complicated but also requires a different treatment of cells of different origin. It is simpler to provide the same delay for all cells. Output units which ensure the same delay for all cells automatically assure the correct order of cells of the same connection.

Even though an exactly equal delay of all cells cannot be ensured in ATM, it is possible in the output units to sort the cells according to time stamps contained therein and then output the cells one after the other when the delay determined by the time stamp is reached. This requires a correspondingly accurate time distribution to all input and output units.

For ATM, and not only for distribution services, it is advantageous to provide equal delays for all cells, i.e., to compensate for delay jitter. If this is combined with the restoration of the correct cell sequence as just indicated, the cost involved is in quite good proportion to the advantage gained.

We claim:

1. An ATM exchange using virtual connections to switch cells, the individual cells associated with each of the virtual connections including respective sequence numbers for identifying the order of the cells of that virtual connection, said ATM exchange comprising a plurality of inputs,
a plurality of outputs,
a switching network,
means for routing each cell to be switched with the aid of path information along a given, connection-oriented path of the switching network from one of said inputs to at least one of said outputs, and
a respective output unit between the switching network and each of the outputs, which includes a buffer for buffering cells to be outputted, wherein each cell, after leaving the switching network, is written into the buffer of the respective output unit, and the order of output of the cells from the buffer is determined with the aid of said sequence numbers.

2. An exchange as claimed in claim 1, further comprising between each of the inputs and the switching network, a respective input unit in which path information is added to each cell.

3. An exchange as claimed in claim 1, further comprising between each of the inputs and the switching network, a respective input unit in which said sequence numbers are added to said cells.

4. An exchange as claimed in claim 1, further comprising distribution means for making copies of at least some of said cells in order to route said some cells to more than one of said outputs.

* * * * *